Figure 1:
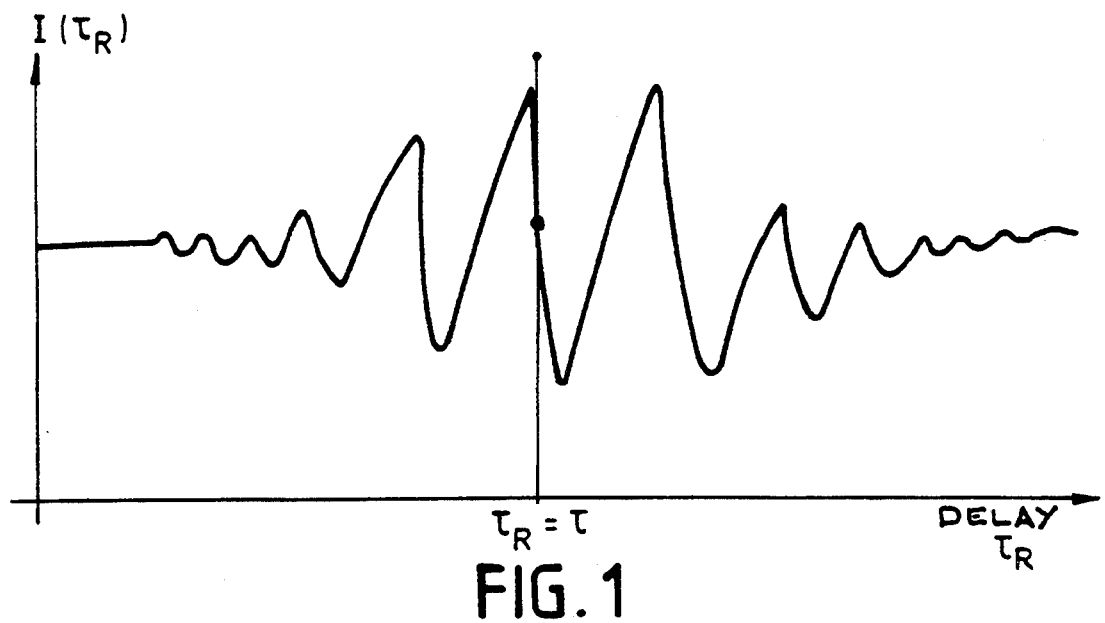

United States Patent
Refregier et al.

[11] Patent Number: 5,363,191
[45] Date of Patent: Nov. 8, 1994

[54] FIBRE OPTIC SENSOR ARRAY READING DEVICE

[75] Inventors: Philippe Refregier, Palaiseau; Marc Turpin, Bures S/Yvette, both of France

[73] Assignee: Thomson-CSF, Puteaux, France

[21] Appl. No.: 47,621

[22] PCT Filed: Nov. 30, 1990

[86] PCT No.: PCT/FR90/00867
§ 371 Date: Jul. 23, 1991
§ 102(e) Date: Jul. 23, 1991

Related U.S. Application Data
[63] Continuation of Ser. No. 730,954, Jul. 23, 1991, abandoned.

[30] Foreign Application Priority Data
Dec. 1, 1989 [FR] France .................... 89 15876

[51] Int. Cl.$^5$ .................................... G01B 9/02
[52] U.S. Cl. ........................ 356/345; 385/12
[58] Field of Search ........... 356/345; 385/12, 14; 250/227.19, 227.27

[56] References Cited
U.S. PATENT DOCUMENTS

| | | | |
|---|---|---|---|
| 4,759,627 | 7/1988 | Thylen et al. | 356/345 |
| 4,799,797 | 1/1989 | Huggins | 356/345 |
| 4,889,986 | 12/1989 | Kersey et al. | 356/345 |
| 4,989,979 | 2/1991 | Buckman | 356/345 |

FOREIGN PATENT DOCUMENTS
0251632  1/1989  European Pat. Off. .
2147695  5/1985  United Kingdom .

OTHER PUBLICATIONS
Patent Abstracts of Japan, vol. 10, No. 15 (P-422)(2072) Jan. 21, 1986 Japanese Appln. 60-170723 (Yokokawa Hokushin Denki KK) Sep. 4, 1985.

Primary Examiner—Samuel A. Turner
Attorney, Agent, or Firm—Oblon, Spivak, McClelland, Maier & Neustadt

[57] ABSTRACT

A device for reading sensors in fiber optics which includes an integrated optics interferometer wherein the interference signal is slaved to a set-point value by means of a negative feedback signal. The measurement for reading the sensors is provided from the negative-feedback generated signal. In one of the disclosed embodiments generated delays of a value greater than an optical wavelength are measured by coupling the interferometer to a counting-up/counting-down system for interference fringe jumps.

9 Claims, 5 Drawing Sheets

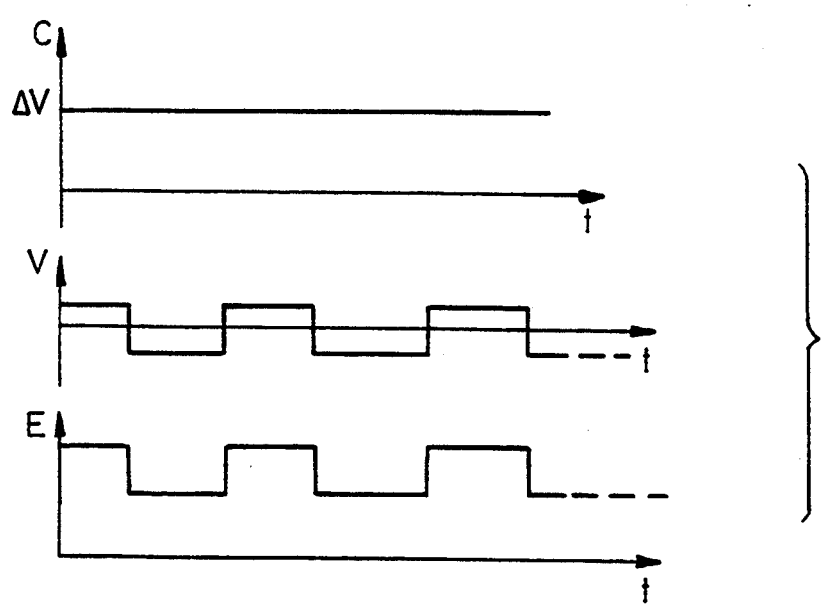
FIG_7
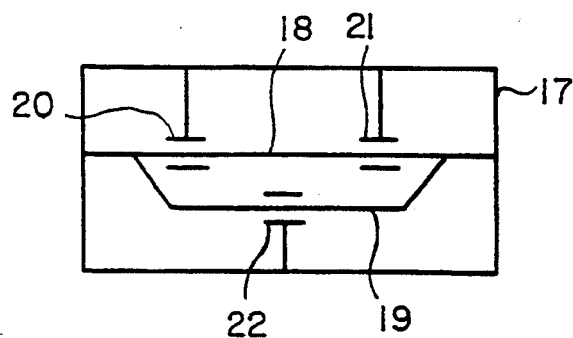
FIG_8
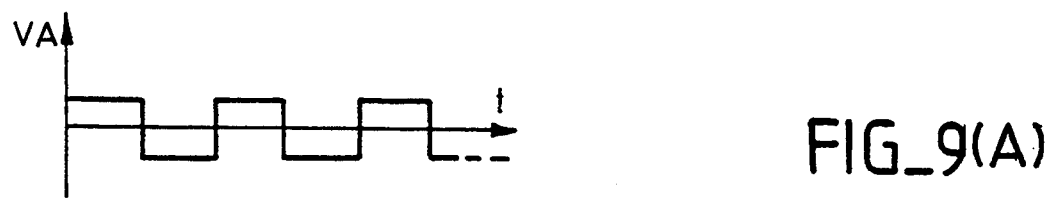
FIG_9(A)
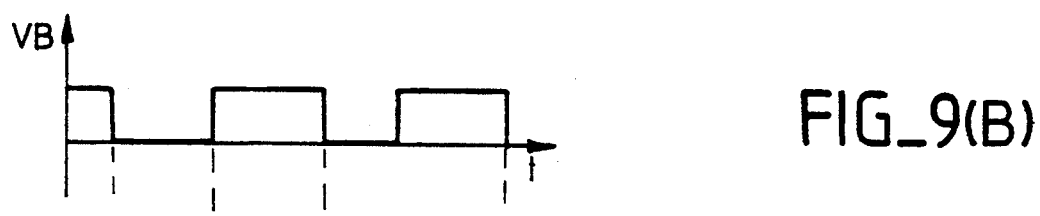
FIG_9(B)
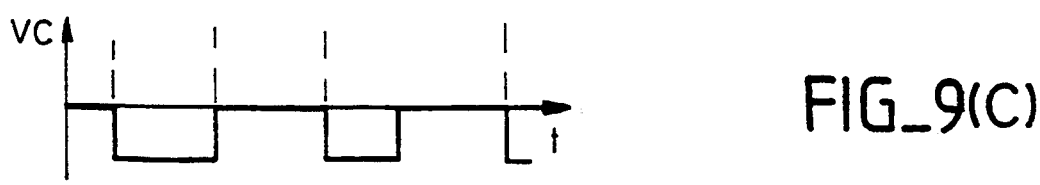
FIG_9(C)

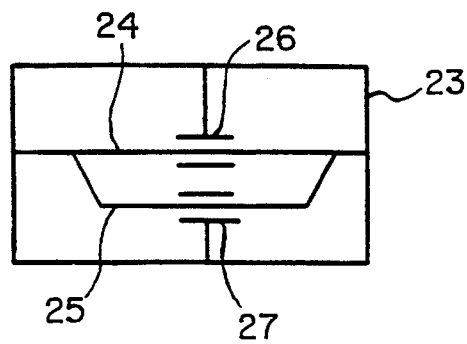
FIG_10
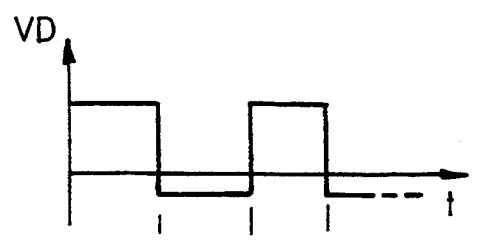
FIG_11(D)
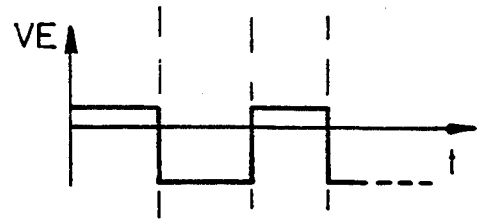
FIG_11(E)
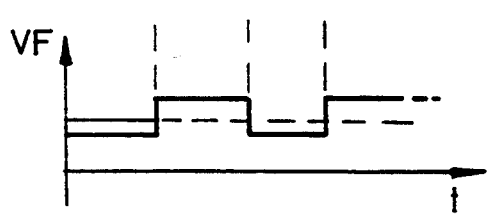
FIG_11(F)

FIBRE OPTIC SENSOR ARRAY READING DEVICE

This application is a Continuation of application Ser. No. 07/730,954, filed on Jul. 23, 1991, now abandoned.

The present invention relates to a fibre optic sensor reading device.

In order to decode the data coming from a network of coherently multiplexed sensors it is necessary to compensate the phase shifts with the aid of an interferometric reading device. Fibre optic interferometers of Mach-Zehnder type or interferometers of Michelson type are used depending on the architecture of the sensor network. In the particular case of weakly coherent multiplexing, the use of non birefringent optical fibres is tricky given the accuracy required for the adjusting of the length of the fibre segments used in passive interferometers of Mach-Zehnder type. In the general case, the Michelson interferometer is widely used in the laboratory given its great versatility and ease of use. However, use outside the laboratory, for example at an industrial site, is very tricky because, in particular, of the fragility of the movable mirrors of this interferometer.

The subject of the invention is a fibre optic sensor reading device which is of small size, easy to regulate and to use, which can be employed in a hostile environment (industrial surroundings, on-board hardware etc.), which offers a sensitivity at least equal to that of known interferometers whilst retaining a good dynamic range, and which has the shortest possible response time.

The fibre optic sensor reading device according to the invention comprises an integrated optics interferometer with two arms of different lengths, followed by a detector and by a circuit for slaving the interferometer, the measuring device receiving the negative-feedback signal of the slaving circuit as the signal to be measured.

According to another characteristic of the invention, at least one of the arms of the interferometer comprises a phase modulator connected to the slaving circuit. Thus, according to the invention, the interferometer with two arms of different lengths permits compensation for the average delay between the two wave trains produced from the optical wave of a weakly coherent source, this delay being a function of the magnitude to be measured, the measurement consisting in determining a magnitude necessary for the slaving of the interferometer. Thus, the measurement is carried out without mechanical displacement, resulting in a better sensitivity of the reader, whilst retaining a good dynamic range, this reader being of short size and offering a short response time.

The present invention will be better understood on reading the detailed description of several embodiments, taken by way of non-limiting examples and illustrated by the attached drawing in which:

FIG. 1 is a graph of a signal collected by a detector associated with a coherent sensor device and with a reader of the prior art.

Figure 2:
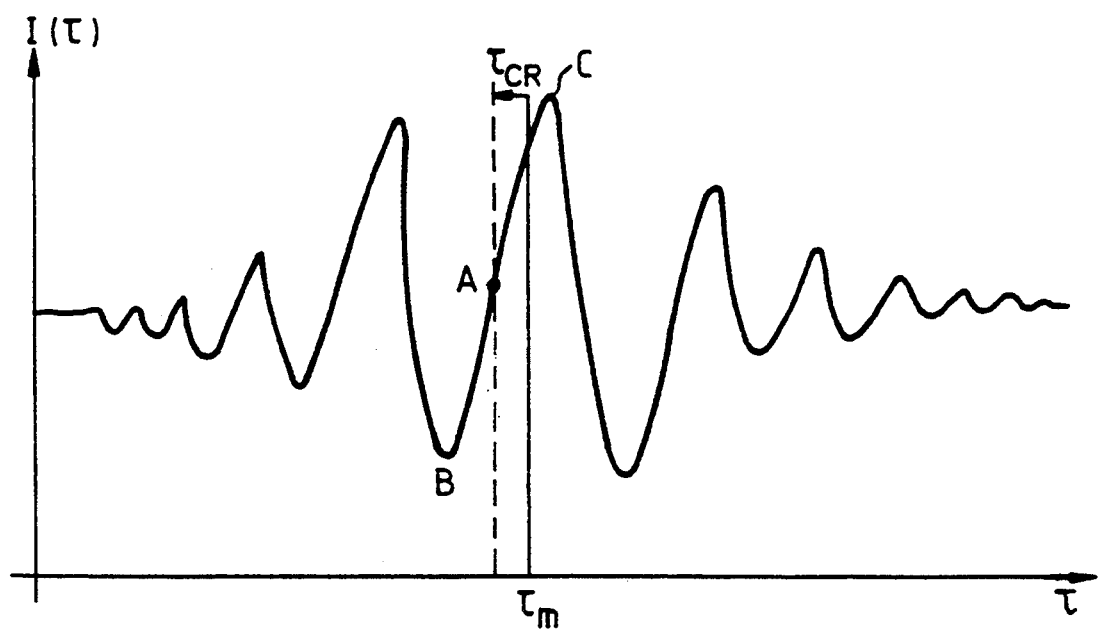
Figure 3:
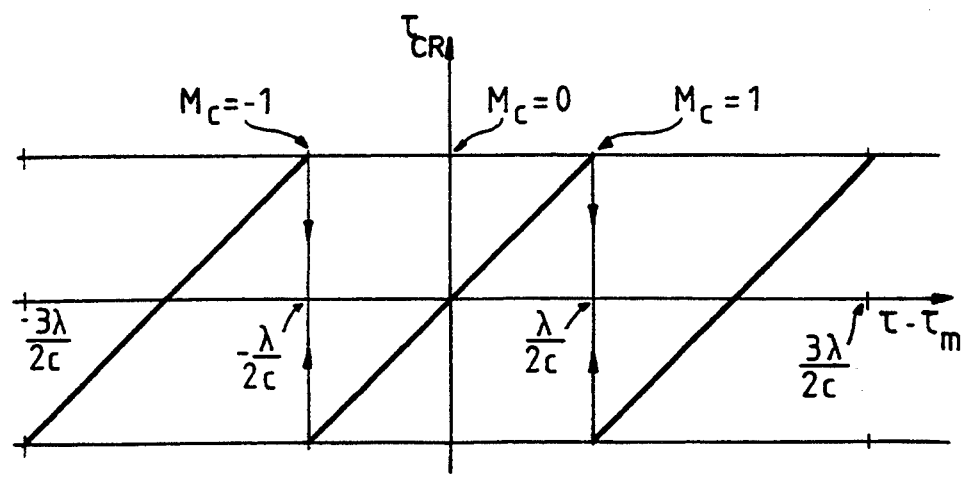
Figure 4:
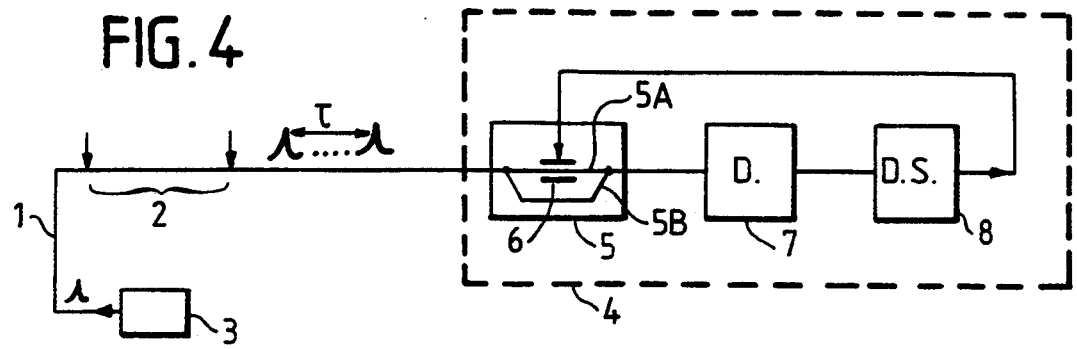
Figure 5:
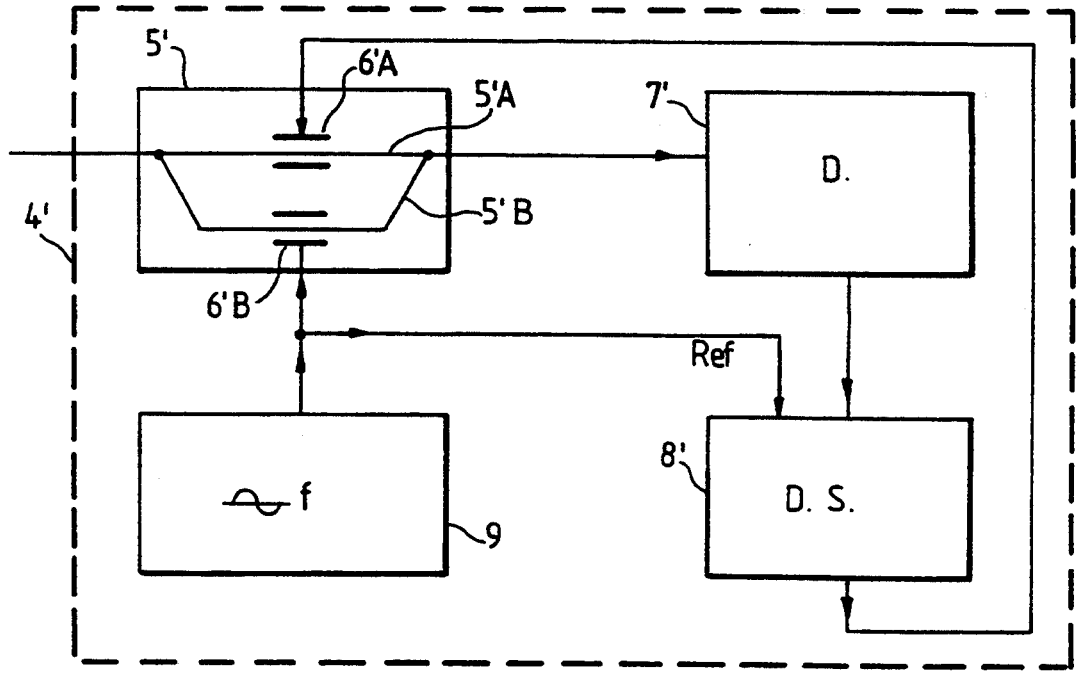

FIG. 2 is a graph of a signal collected by a detector associated with a coherent sensor device and with a reader according to the invention, FIG. 3 is a graph explaining the principle of operation for reading signals with large delay, with the aid of a reader according to the invention, FIG. 4 is a block diagram of a reading device according to the invention, FIG. 5 is a block diagram of a variant of a part of the reading device of FIG. 4.

Figure 6:
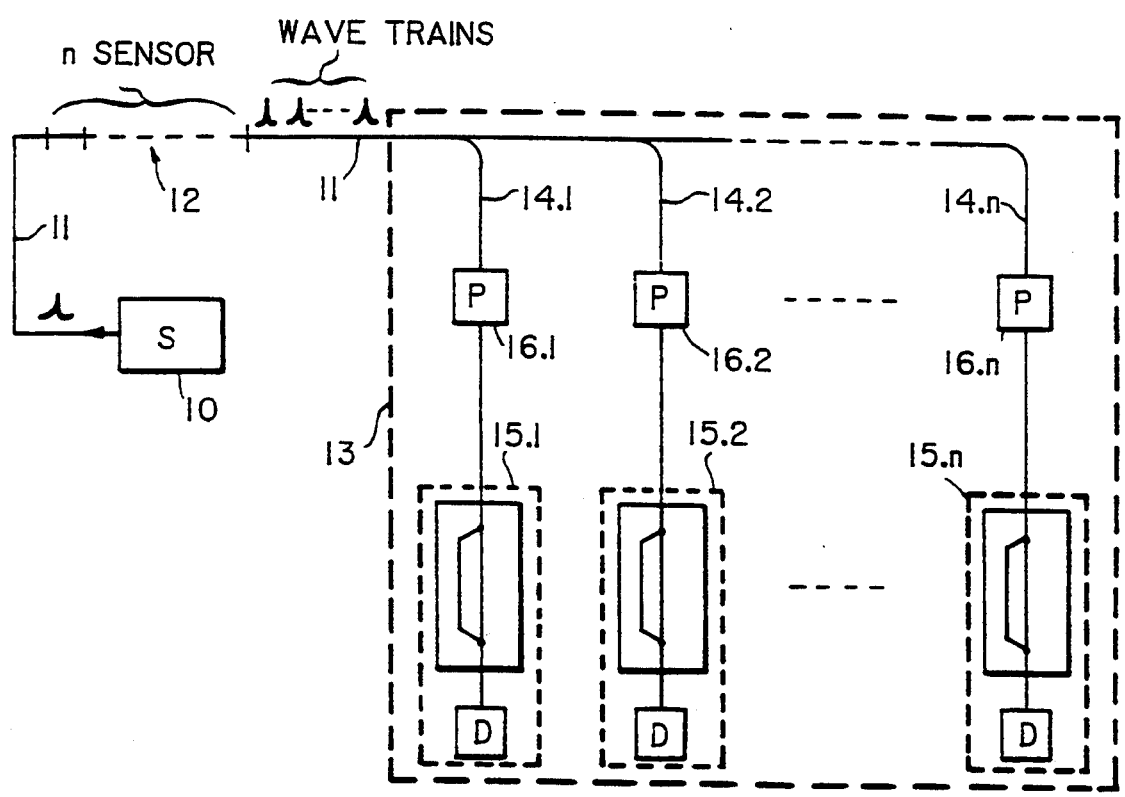

FIG. 6 is the simplified block diagram of a reading device according to the invention for the reading of multiplexed signals, FIGS. 8 and 10 are diagrams of interferometers used by the invention and, FIGS. 7, 9 and 11 are graphs of wave shapes used in the slaving circuit of the invention.

The principle of the measuring of physical magnitudes with the aid of fibre optic sensors operating coherently will firstly be described. Operating coherently means that the datum relating to the physical magnitude to be measured is contained in the delay (that is to say the phase shift) between two optical wave trains generated from a single wave produced by a weakly coherent source (coherence wavelength less than a few hundreds of microns).

A few orders of magnitude permit the advantage in coherence methods to be specified in relation to the other techniques (modulation of the intensity of the optical wave, modulation of the delay between two pulses or of a frequency-modulated signal, etc.). The coherence length $l_c$ can be as small as 30$\mu$m. With superluminescent diode sources, good coupling with monomode optical fibres can be obtained; coupled power of the order of 100$\mu$W.

From the point of view of the processing of the signal such characteristics are similar to those which would be obtained with pulses of $10^{-14}$ s and peak powers of $10^8$W.

The principle of the measurement is as follows. For coherence sensors, the measurement can be carried out only by correlation. In fact, the optical wave generated by a source with weak coherence is a random signal, this prohibiting carrying out the measurement with the aid of filtering techniques. This situation exhibits strong similarities with radars referred to as noise radars which, despite their very attractive time-frequency ambiguity function, are in practice can (sic) used. In general the pulse compression technique which permits analysis by filtering is very often preferred to that of noise radars.

If we denote A(t) the optical wave emitted by the source, the sensor generates a second wave $A(t-\tau)$ which differs from the first only by the delay $\tau$. The measuring of this delay (or phase shift) permits the value of the physical magnitude (temperature, pressure, etc...) to be determined. At the output of the sensing part of the optical fibre, the total optical wave is $A_T(t)=A(t)+A(t-\tau)$, and, by assumption, takes place in the case where this delay is much greater than the coherence time of the source $\tau_c$:

$$\tau > \tau_c = \lambda_c/c$$

where c is the speed of light.

From a practical point of view, this means that the average value over a time interval T (sufficiently large compared with the period of the optical wave) of the product (correlation function): $A(t).A(t-\tau)$ is nil, or:

$$\frac{1}{T}\int_T A(t) \cdot A(t-\tau)dt \simeq O$$

In what follows this average value will be denoted by the symbolic notation $<>$:

$$\frac{1}{T}\int_T f(t)dt = \langle f(t)\rangle.$$

A direct measurement of the wave $A_T(t)$ does not therefore permit determination of $\tau$. Two waves must be generated from $A_T(t)$ so as to compensate this delay $\tau$ before effecting interferences on a detector. Hence, from $A_T(t)$ two new waves are generated $A_{T1}(t)$ and $A_{T2}(t)$ such that:

$$A_{T1}(t) = k\, A_T(t) = k'\,\{A(t) + A(t-\tau)\}$$

$$A_{T2}(t) = k\, A_T(t-\tau_R) = k'\,\{A(t-\tau_R) + A(t-\tau-\tau_R)\}$$

k and k' being proportionality factors.

Now if $(\tau - \tau_R)$ is less than the coherence time, which will be called more simply "catching up the delay" the interference of $A_{T1}(t)$ and $A_{T2}(t)$ on a detector will contain a term proportional to $\langle A(t).A(t-\Delta\tau)\rangle$ where $\Delta\tau = \tau - \tau_R$.

The signal which is observed on a detector as a function of $\tau_R$ therefore has the form represented in FIG. 1.

According to the invention an integrated optics interferometer (IOI) is used, the two arms of which exhibit a difference in length corresponding to a delay $\tau_o$ equal to the average delay $\tau_m$, $\tau_m$ being the average delay relative to the physical magnitude to be measured. Once this average delay is compensated, the interference signal is slaved to a set-point value, and the measurement is preferably carried out on the negative-feedback signal after calibrating the reading device. The slaving is effected by using one of the arms of the interferometer as phase modulator, this being easy a priori with an I.O.I.

We then have the situation illustrated by the graph of FIG. 2 where $\tau_{CR}$ represents the negative-feedback delay introduced by the phase modulator. Therefore: $\tau = \tau_m + \tau_{CR}$ knowing $\tau_m$ a priori and $\tau_{CR}$ by the voltage for controlling the negative-feedback signal, $\tau$ is thereby deduced, that is to say the delay due to the sensor and hence the value of the physical magnitude to be measured. On the curve of FIG. 2 the point A, exhibiting a delay $\tau_{CR}$ should be situated substantially midway between the points B (minimum) and C (maximum) that is to say substantially in the middle of a zone BC of large amplitude, this so as to obtain, during detection of the a.c. slaving modulating signal, an optimal signal over noise ratio. The slaving circuit is described below.

The delay which can be induced with an integrated optical phase modulator which is of the order of $\lambda$, the optical wavelength, has been examined. It is clear that situations exist in which the difference between the average delay $\tau_m$ (introduced by the difference in length between the two optical paths of the I.O.I.) and the delay $\tau$ (due to the sensing part of the optical fibre) can be greater than the wavelength.

According to the invention, the solution to this problem consists in coupling the system for negative-feedback of the slaving device to a counting-up/counting-down system which permits production of jumps from one interference fringe to the next.

This principle is therefore as follows: if the delay $\tau_{CR}$ to be generated is greater than a phase shift of $\pi$, a negative voltage jump is effected corresponding to a phase shift of $2\pi$ and one unit is added to the up-counter.

For the symmetrical situation in which the phase shift to be generated is less than $-\pi$, this time a positive voltage jump is produced (corresponding to a phase shift of $2\pi$) and one unit is subtracted from the up-counter. The situation illustrated in FIG. 3 therefore occurs. In this figure, $M_c$ represents the value of the up-counter and c the speed of light (delay: $\lambda/c \langle - \rangle$ phase shift to be generated equal to $2\pi$).

The orders of magnitude of the accuracy which can be achieved with the device of the invention will now be discussed.

The very simple case is considered of a silica temperature sensor: $dn/dT \approx 10^{-5}$, the length of which generating the delay P is 1 cm. If it is assumed that the accuracy of the slaving and (sic) of the order of $10^{-3}\,2\pi$ rd (this corresponding to a not very severe constraint), the accuracy in the temperature will be $$2\pi \cdot \frac{l}{\lambda}\,(dn/dt)\cdot dT = 10^{-3}\times 2\pi$$

$$dT = \frac{\lambda}{l(dn/dt)}\cdot 10^{-3}$$

$$= 10^{-2}\ °C.$$

if $\lambda = 1$ μm, and $P_c$ being the coherence length of the source, the number of fringes present in the signal will be $P_c/\lambda$. The dynamic range will therefore be, if $l_c \approx 30$ μm $$\Delta T = \frac{lc}{\lambda}\cdot 100°\ C. \approx 3000°\ C.\ (100°\ C.\ \text{being the } \Delta T \text{ for } 2\pi\ rd),$$

Which is in fact greatly superior to the technological possibilities of fibre optics.

So as to slave the signal of the detector to a set-point value, it is advantageous to operate on the derivative of the interference fringes. This means that a small alternating voltage: $\epsilon\cos(\omega t)$ must be superimposed on the value of the control voltage which generates $\tau$, and the value of the signal with frequency $2(\omega/2\pi)$ analysed with the aid of a synchronous detection. This control voltage is a voltage which varies proportionally to the variation in the phase shift to be measured. Its variations are slow in comparison with the frequency of the modulating signal serving in the synchronous detection. The slaving is thus carried out while seeking to annul this error signal.

Integrated optics interferometers have pass bands which can be of the order of several GHz, and this measuring method can therefore permit analysis of rapidly varying physical magnitudes.

This method does not permit an absolute measurement of the physical magnitude to be annulled. Errors can accumulate on the up-counter/down-counter, and it is necessary to continue with regular calibrating in order to accurately redefine the zero of the counter. This problem is not particular to this measuring method, and the re-calibrating to a reference signal is a solution well known per se.

An examplary embodiment of a reader according to the invention will now be described with reference to FIG. 4. An optical fibre 1 comprises a section 2 serving as sensor of physical magnitude. The fibre 1 is fed by an at least weakly coherent source 3, and is connected to a reading device 4 charged with analysing the delay $\tau$ produced in the sensor 2. According to the invention, the device 4 comprises an interferometer 5 which has two arms 5A, 5B of different lengths, the am 5A being the shorter. Their difference in length can for example lie between 100 μm and 1 cm approximately.

According to a preferred embodiment, the interferometer 5 is of the Mach-Zehnder type, in integrated optics. The interferometer 5 comprises on one of its two arms, for example the arm 5A, a phase modulator 6. The output of the interferometer 5 is connected to a conventional detector 7, itself connected to a synchronous detector 8. The output of the detector 8 is connected in negative-feedback to the phase modulator 6.

According to the variant represented in FIG. 5, the reading device 4' comprises an interferometer 5', likewise in integrated optics, with two arms 5'A, 5'B of unequal lengths, the arm 5'A being the shorter. On each of the arms 5'A, 5'B is disposed a phase modulator, 6'A, 6'A (sic) respectively. The output of the interferometer 5' is connected to a conventional detector 7', itself connected to a synchronous detector 8'. A generator 9 of substantially sinusoidal voltage, producing a voltage of frequency f, is connected to a voltage input for referring the detector 8' to the modulator 6'B. The output of the detector 8' is connected to the modulator 6'A. The component of frequency $2f$, demodulated, is collected on this output of the detector 8'.

A reading device for coherently multiplexed sensors has been represented in FIG. 6. A source 10 of light pulses is connected to an optical fibre 11 in which a measuring device 12 is inserted. This device 12 comprises n sensors which are either different sensors, or sections of sensors of the same optical fibre. The reading device 13 branched to the output of the device 12 is charged with measuring n delays of wave trains generated by the n sensors. The reading device 13 comprises n shunt branches 14.1 to 14.n from a main fibre 11' connected to the output of the device 12. Onto each of the branches 14.1 to 14.n is branched a reading device 15.1 to 1 5.n (not represented in detail) such as the device 4 or the device 4'. These devices 15.1 to 15.n may each be preceded by a polariser 16.1 to 16.n, each of the interferometers being slaved in the manner represented in FIG. 4 or in FIG. 5. The principle of operation of coherently multiplexed sensors has been described for example in French Patent Applications Nos 88 00780 and 88 00781. Obviously, the n integrated optics interferometers of the reading device 13 can be produced on the same common substrate, during the same manufacturing process.

The interferometer of the invention is advantageously produced according to the art for integrated optics circuits. According to a first embodiment, it can be produced on a substrate such as $LiNbO_3$. The arms of the interferometer are optical wave guides formed by diffusion of titanium.

According to another embodiment, a material comprising GaIAs or GaInAsP is used for the substrate of the integrated optics circuits. In this case, the optical waveguides are preferably formed epitaxially.

Given that the integrated optics circuits have very small dimensions (effective width of a Mach-Zehnder interferometer of approximately 100 μm), a large number of them can be manufactured on the same substrate.

In order to slave the interferometer, a control voltage (which can be considered as a d.c. voltage C for a short lapse of time relative to the period of the signal which modulates it, and which is represented at the top of FIG. 7) must be produced, on which is superimposed an a.c. signal V (represented in the middle of FIG. 7), which can be rectangular, but not necessarily, this so as to generate a modulated error signal E, as represented at the bottom of FIG. 7. So as to simplify FIGS. 7, 9 and 11 of the drawing, it has been assumed that in the very brief time interval represented in these figures, the phase shift to be measured does not vary, and hence that the control voltage does not vary. Obviously, if a large lapse of time is considered, this control voltage varies in line with the variations in the phase shift to be measured, and exhibits Jumps in value on each occasion that the variations in the phase shift exceed a $2\pi$ bracket (if, for example, the control voltage has its nominal value for a phase shift lying between $-\pi$ and $+\pi$, a first jump of this control voltage permits operation in the $+M$, $+3M$ (sic) range, a second in the $+3\pi$, $+5\pi$ range, etc. and the same is true for negative values of phase shift: $-\pi$, $-3\pi$, etc. ), as is deduced from FIG. 3.

A first solution consists in applying the voltage C to one modulator (for example 6'A in FIG. 5) and the signal V to the other (6'B).

According to a second solution (FIG. 8), an interferometer 17 with two arms 18, 19 is used. In one of the arms, for example, the arm 18, two modulators 20, 21 are formed, and in the other, a single modulator 22.

An a.c. voltage of substantially rectangular shape $V_A$ with nil average value, such as represented at A in FIG. 9, is applied to one of the modulators of the arm 18, for example the modulator 20. A substantially rectangular voltage VB such as represented at B in FIG. 9, the low level of which is equal to zero and the high level of which is positive, is applied to the other modulator 21 of the arm 18. A voltage VC, such as represented at C in FIG. 8, which is synchronous with VB, the high level of which is equal to zero, and the low level of which is negative and equal, in absolute value, to the high level of VB, is applied to the modulator 22. The frequency of VB and of VC must be a higher frequency than the maximum frequency of the variations in the phase shift to be measured. Subtraction of VB and of VC gives a positive DC voltage of value equal to the amplitude of VB. This solution exhibits the advantage of avoiding the application of a d.c. voltage to one of the arms of the interferometer, since the d.c. voltage could cause damage to the integrated optics of this interferometer and provoke electronic noise (noise inversely proportional to the frequency).

The third solution (FIG. 10) calls upon an interferometer 23 with two arms 24, 25 each comprising a modulator 26, 27 respectively, which interferometer can be the same as the interferometer 5' of FIG. 5. A substantially rectangular signal with positive average value VD, such as represented at D in FIG. 10 (sic), is applied to one of the modulators, and to the other modulator a substantially rectangular signal with negative average value synchronous with VD and such as represented at E in FIG. 11. The low level of the signal VD is slightly negative, and its high level is positive and of greater value than the absolute value of the low level. The high level of the signal VE is slightly positive, and its low level is negative, of absolute value greater than the value of the high level. The difference VD minus VE gives the signal VF such as represented at F in FIG. 11. This signal VF shows up as a rectangular signal superimposed on a positive d.c. component. This solution exhibits, in addition to the advantages of the preceding solution, the advantage of calling upon only digital circuits, and of requiring only two phase modulators.

In these three solutions, if a lapse of time is considered which is sufficiently long to be able to observe variations in the phase shift to be measured, the control voltage is not a horizontal line, but a curve the form of which reflects the form of the curve of the variations in the phase shift. In order not to have to modify the shape of the abovementioned a.c. voltages (rectangular shape), their frequency must be markedly greater than the frequency of the variations in the phase shift to be measured.

We claim:

1. A device for reading sensors coherently, said device comprising:
a single integrated optics interferometer having two arms of different length with at least one of said arms having a phase modulator, a first detector, and circuit for slaving said interferometer including a feedback control synchronous detector for controlling said slaving of said interferometer wherein a control voltage necessary for slaving said interferometer by a negative-feedback signal provides a signal to be measured in order to coherently read said sensors, wherein said phase modulator is integrated with said single interferometer and wherein said synchronous detector is directly connected to said phase modulator.

2. Device according to claim 1, wherein said slaving circuit comprises a generator of substantially sinusoidal voltage, connected to the interferometer and to a synchronous detector itself connected to the interferometer.

3. A device according to claim 1, wherein said slaving circuit further includes a means responsive to delays to be measured of a value greater than a given optical wavelength, for generating a jump voltage corresponding to interference fringe jumps.

4. Device according to claim 1, wherein for reading n sensors disposed in series and multiplexed coherently, said device further comprises, shunted onto a main fibre, n branches each comprising an interferometer and a detector.

5. Device according to claim 3, wherein the interferometer of the reading device receives a first control voltage segment varying in line with the variations in the delays to be measured and (C) controls the interference fringe jumps, and an a.c. voltage segment (V).

6. Device according to claim 5, wherein one arm of the interferometer comprises a modulator receiving a control voltage, and in that the other arm comprises a modulator receiving an a.c. voltage.

7. Device according to claim 1, wherein one arm of the interferometer comprises two modulators one of which receives an a.c. voltage with nil average value, and the other a first substantially rectangular signal, the other arm of the interferometer receiving a second substantially rectangular signal synchronous with the first, one of the substantially rectangular signals being positive, and the other negative, their amplitude having equal absolute values.

8. Device according to claim 1, wherein one of the arms of the interferometer comprises a modulator receiving a first substantially rectangular signal, the other arm comprising a modulator receiving a second substantially rectangular signal synchronous with the first, the average value of one of the signals being positive, and the average value of the other being negative.

9. A device for reading sensors coherently, said device comprising:
a single integrated optics interferometer having two arms of different lengths with at least one of said arms having a phase modulator, a detector, and a circuit for slaving said interferometer including a feedback control means for controlling said slaving of said interferometer wherein a control voltage necessary for slaving said interferometer by a negative-feedback signal provides a signal to be measured in order to coherently read said sensors, said slaving circuit further including a means responsive to delays of a value greater than a given optical wavelength, for generating a jump voltage corresponding to interference fringe jumps.

* * * * *